US008548955B1

(12) United States Patent
Meinsen (10) Patent No.: US 8,548,955 B1
(45) Date of Patent: Oct. 1, 2013

(54) SYSTEM AND METHOD FOR AUTOMATING DISASTER RECOVERY OF A MAINFRAME COMPUTING SYSTEM

(75) Inventor: David Meinsen, Independence, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 2083 days.

(21) Appl. No.: 10/999,510

(22) Filed: Nov. 30, 2004

(51) Int. Cl.
*G06F 17/00* (2006.01)

(52) U.S. Cl.
USPC .......................................................... 707/674

(58) Field of Classification Search
USPC .......................................................... 707/204
See application file for complete search history.

(56) References Cited

U.S. PATENT DOCUMENTS

| | | | | |
|---|---|---|---|---|
| 5,412,801 | A * | 5/1995 | de Remer et al. | 714/20 |
| 5,452,449 | A | 9/1995 | Baldwin et al. | |
| 5,649,196 | A * | 7/1997 | Woodhill et al. | 707/204 |
| 5,778,387 | A * | 7/1998 | Wilkerson et al. | 1/1 |
| 5,872,970 | A | 2/1999 | Pickett et al. | |
| 5,983,364 | A | 11/1999 | Bortcosh et al. | |
| 6,490,598 | B1 * | 12/2002 | Taylor | 1/1 |
| 6,571,270 | B1 * | 5/2003 | Lai et al. | 718/101 |
| 7,191,364 | B2 | 3/2007 | Hudson et al. | |
| 7,487,406 | B2 | 2/2009 | Kobrosly et al. | |
| 7,681,181 | B2 | 3/2010 | Canning et al. | |
| 8,255,747 | B1 | 8/2012 | Meinsen | |
| 2004/0128583 | A1 | 7/2004 | Iulo et al. | |
| 2004/0153791 | A1 | 8/2004 | Arend et al. | |
| 2005/0278397 | A1 * | 12/2005 | Clark | 707/204 |

OTHER PUBLICATIONS

Ubiquity, "Software Inventors for IBM z/OS" white paper, Oct. 2000, 6 pages.*
Non-Final Office Action Date mailed Dec. 12, 2008 for U.S. Appl. No. 10/999,557.
Response filed Mar. 2, 2009 to Non-Final Action date mailed Dec. 12, 2008 in U.S. Appl. No. 10/999,557.
Final Rejection date mailed Jun. 4, 2009 in U.S. Appl. No. 10/999,557.
RCE/Amendment filed Sep. 2, 2009 in U.S. Appl. No. 10/999,557.
Non-Final Rejection date mailed Sep. 17, 2009 in U.S. Appl. No. 10/999,557.
Response filed Dec. 14, 2009 to Non-Final Rejection date mailed Sep. 17, 2009 in U.S. Appl. No. 10/999,557.
U.S. Appl. No. 10/999,557; Non-Final Rejection dated Oct. 6, 2011; 16 pages.
U.S. Appl. No. 10/999,557; Advisory Action dated Apr. 27, 2011; 7 pages.
U.S. Appl. No. 10/999,557; Final Rejection dated Jan. 6, 2011; 11 pages.

(Continued)

*Primary Examiner* — Usmaan Saeed
*Assistant Examiner* — Michael Le
(74) *Attorney, Agent, or Firm* — Swanson & Bratschun, L.L.C.

(57) ABSTRACT

The present invention relates to a system and method for determining whether databases in a mainframe computing system have updated image copies. A list of all databases in a mainframe computing system is received and backup data for each of the databases is received. From the backup data it is determined whether each of the databases has a current image copy. If each of the databases does not have a current image copy the databases without a current image copy are identified. The present invention also relates to a method for automatically creating control cards and job control language (JCL) for restoring a mainframe computing system.

35 Claims, 5 Drawing Sheets

(56) References Cited

OTHER PUBLICATIONS

U.S. Appl. No. 10/999,557; Examiner's Amendment dated May 30, 2012; 4 pages.
U.S. Appl. No. 10/999,557; Issue Notification dated Aug. 8, 2012; 1 page.
Final Rejection date mailed Mar. 5, 2010 in U.S. Appl. No. 10/999,557.
Non-Final Office Action date mailed Jul. 21, 2010 in U.S. Appl. No. 10/999,557.

\* cited by examiner

| Obs | DBD | DSN | DBORG | UNIT | LASTIC | ALLOC | SSID | NOTE |
|---|---|---|---|---|---|---|---|---|
| | | | | | MEMBER=SRM | | | |
| 137 | SRM0TABL | MWG.IC2.SRM0TABL.SRM0TABL.G1762V00 | HIDAM | DISK | 2004.214 21:23:52.5 | 2004.214 11:00:12.7 | 1 | |
| 138 | SRM0TOLL | MWG.IC2.SRM0TOLL.SRM0TOLL.G1767V00 | HIDAM | DISK | 2004.214 08:04:18.8 | 2004.214 23:54:57.7 | 1 | |
| 139 | SRM0TRAN | MWG.IC2.SRM0TRAN.SRM0TRAN.G1770V00 | HIDAM | DISK | 2004.214 21:23:52.5 | 2004.215 00:01:37.8 | 1 | |
| 140 | SRM0TRKG | MWG.IC2.SRM0TRKG.SRM0TRKG.G1759V00 | HIDAM | DISK | 2004.214 08:01:52.6 | 2004.214 08:01:52.3 | 1 | |
| | | | | | MEMBER=TAK | | | |
| Obs | DBD | DSN | DBORG | UNIT | LASTIC | ALLOC | SSID | NOTE |
| 141 | TAK0UMST | CEK.IC2.TAK0UMST.TAK0UMST.G1119V00 | HDAM | DISK | 2004.212 23:30:18.4 | | 0 | |
| | | | | | MEMBER=TAM | | | |
| Obs | DBD | DSN | DBORG | UNIT | LASTIC | ALLOC | SSID | NOTE |
| 142 | TAM0UMST | UTM.IC2.TAM0UMST.TAM0UMST.G1408V00 | HDAM | DISK | 2004.212 22:30:42.8 | | 0 | |
| | | | | | MEMBER=TAN | | | |
| Obs | DBD | DSN | DBORG | UNIT | LASTIC | ALLOC | SSID | NOTE |
| 143 | TAN0UMST | UTN.IC2.TAN0UMST.TAN0UMST.G1312V00 | HDAM | DISK | 2004.212 23:30:20.0 | | 0 | |
| | | | | | MEMBER=TDM | | | |
| Obs | DBD | DSN | DBORG | UNIT | LASTIC | ALLOC | SSID | NOTE |
| 144 | TDM0CODB | UTM.IC2.TDM0CODB.TDM0CODB.G1139V00 | HIDAM | DISK | 2004.212 22:01:10.0 | | 0 | |
| 145 | TDM0HIDB | UTM.IC2.TDM0HIDB.TDM0HIDB.G1144V00 | HIDAM | DISK | 2004.212 22:01:40.2 | 2004.213 19:18:40.2 | 1 | SCHEDULE TDHIDBMK |
| 146 | TDM0ISDB | UTM.IC2.TDM0ISDB.TDM0ISDB.G1139V00 | HIDAM | DISK | 2004.212 22:01:30.3 | 2004.212 06:02:34.8 | 1 | |
| 147 | TDM0ADB | UTM.IC2.TDM0ADB.TDM0ADB.G1129V00 | HIDAM | DISK | 2004.212 22:01:39.1 | | 1 | |
| 148 | TDM0RTDB | UTM.IC2.TDM0RTDB.TDM0RTDB.G1132V00 | HIDAM | DISK | 2004.212 22:01:39.1 | | 1 | |
| 149 | TDM0TEDB | UTM.IC2.TDM0TEDB.TDM0TEDB.G1144V00 | HIDAM | DISK | 2004.212 22:01:40.1 | 2004.213 19:18:41.1 | 1 | SCHEDULE TDTEDBMK |
| | | | | | MEMBER=TEM | | | |
| Obs | DBD | DSN | DBORG | UNIT | LASTIC | ALLOC | SSID | NOTE |
| 150 | TEM0INST | MWG.IC2.TEM0INST.TEM0INST.G1750V00 | HIDAM | DISK | 2004.214 23:52:08.3 | 2004.214 23:51:16.7 | 0 | |
| 151 | TEM0MSTR | MWG.IC2.TEM0MSTR.TEM0MSTR.G1622V00 | HIDAM | DISK | 2004.215 02:10:00.0 | 2004.215 02:09:24.0 | 0 | |
| | | | | | MEMBER=TIM | | | |
| Obs | DBD | DSN | DBORG | UNIT | LASTIC | ALLOC | SSID | NOTE |
| 152 | TIM0WCDB | MWG.IC2.TIM0WCDB.TIM0WCDB.G1625V00 | HIDAM | DISK | 2004.214 22:30:05.9 | | 0 | |

```
//RECL1CBM JOB (7019,TEST),DSTS.DBA,MSGCLASS=R,CLASS=A
//*       DISASTER RECOVERY FOR CBM DATA BASES
//*       DATE 01/17/99
//$IMS    INCLUDE MEMBER=$PRD011
//RECL1CBM EXEC DBADRT$,MEMBER=CBM
//DBADRT$  PROC MEMBER=
//********************************************************
//*       SPRINT GENERIC IMS UTILITIES                    *
//*       DISASTER RECOVERY OF IMS DATA BASES             *
//*       RELEASE-001    DATE 04/30/98                    *
//*       THIS PROC WILL RECOVER ALL DATA BASES FOR A SYSTEM *
//*       IN ORDER TO PERFORM RECOVERIES IN DR SITE REMOVE THE *
//*       SCAN(Y) IN DBA.CTLCARD(GLBL)                    *
//*       MEMBER=MEMBER NAME IN DBA.SMFID.RECOVCTL        *
//********************************************************
//RECOV    EXEC PGM=RVPUMAIN
//STEPLIB  DD  DSN=SYSM.&IMSID..PRODUCTS,DISP=SHR
//         DD  DSN=&IMSID..&SYSID..RESLIB,DISP=SHR
//         DD  DSN=&IMSID..&SYSID..DYNALLO.LOADLIB,DISP=SHR
//IMS      DD  DSN=&IMSID..&SYSID..DBDLIB,DISP=SHR
//DFSRESLB DD  DSN=&IMSID..&SYSID..RESLIB,DISP=SHR
//DFSURWF1 DD  UNIT=DISK,SPACE=(CYL,(100,50))
//AMSPDS   DD  DSN=RDC.&SMFID.DELDEF,DISP=SHR
//SYSPRINT DD  SYSOUT=*
//SYSOUT   DD  SYSOUT=*
//SYSUDUMP DD  SYSOUT=U
//RVPSYSIN DD  DSN=DBA.CTLCARD(GLBL),DISP=SHR
//         DD  DSN=DBA.&SMFID.RECOVCTL(&MEMBER),DISP=SHR

DBA.smfid.RECOVCTL(CBM)

AREC DBD(CBM0BNKC) DDN(CBM0BNKC) DUMP(*) IC(*) ICPREF(MWG) -
     TIMESTMP(001172204181)     SIC(Y)
AREC DBD(CBM0CDEP) DDN(CBM0CDEP) DUMP(*) IC(*) ICPREF(MWG) -
     TIMESTMP(001171330149)     SIC(Y)
AREC DBD(CBM0CRDB) DDN(CBMLCRDB) DUMP(*) IC(*) ICPREF(MWG) -
     TIMESTMP(001172206173)     SIC(Y)
AREC DBD(CBM0CRDB) DDN(CBM0CRDB) DUMP(*) IC(*) ICPREF(MWG) -
     TIMESTMP(001172206173)     SIC(Y)
AREC DBD(CBM0CTDB) DDN(CBM0CTDB) DUMP(*) IC(*) ICPREF(MWG) -
     TIMESTMP(001172206173)
AREC DBD(CBM0CUDB) DDN(CBM0CUDB) DUMP(*) IC(*) ICPREF(MWG) -
     TIMESTMP(001141842095)     SIC(Y)
```

FIG. 6.

SYSTEM AND METHOD FOR AUTOMATING DISASTER RECOVERY OF A MAINFRAME COMPUTING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of computer programming. More particularly, the present invention provides a new and useful method for automatically providing disaster recovery for a mainframe computing system.

BACKGROUND OF THE INVENTION

It is important to backup a mainframe computing system in case of a disaster. Databases such as those shown in FIG. 1 have image copies made and these are sent to offsite storage. The image copies are copies of the databases at the time the image copy was made. If the mainframe computing system is down or destroyed due to a natural or man-made disaster, the image copies can be accessed to restore the mainframe computing system. For instance, most databases have an image copy made nightly and sent offsite. This way the mainframe computing system can be restored to its status from the night before and business can continue if a disaster occurs.

Database image copies can be accessed to restore the mainframe computing system by running a job. The term "job" is often used to describe a process to be carried out on a computer. Exemplary jobs may be carried out on, for instance, a mainframe computer, including recovering databases from image copies and restoring the system. In mainframe computer environments, often times there are three separate pieces of documentations that are necessary for a job to be executed: (1) a job information document in Job Control Language (JCL), (2) a procedure, and (3) a control card. The job information document generally provides at least one job card, for instance setting forth a job name, and one or more statements which indicate what is to be executed. Generally, an execute statement identifies, at least, the name of the procedure to be executed. The procedure is a set of JCL statements that, when executed perform a given process such as restoring databases. The procedure also identifies the control cards necessary for it to be executed. A control card is a record defining what is to be done in the procedure.

Currently there are no processes to determine whether an image copy of a database on the mainframe computing system has been made. A database administrator is required to go through a report to determine that each database in the mainframe computing system has a current image copy. Furthermore, the control cards needed to run the jobs to recover the databases once the image copies have been sent offsite, currently, must be manually built for each database. Because there is no check to determine what databases have had image copies made and sent offsite, it is difficult to recover the mainframe computing system properly from the disaster recovery site because image copies are often missing.

It would be beneficial to be able to automatically determine if a database has an updated image copy stored for disaster recovery if needed. It would also be beneficial to automatically build the necessary control cards needed for disaster recovery.

SUMMARY OF THE INVENTION

In one embodiment, the present invention relates to a method for determining whether databases in a mainframe computing system have updated image copies. A list of all databases in a mainframe computing system is received and backup data for each of the databases is received. From the backup data it is determined whether each of the databases has a current image copy. If each of the databases does not have a current image copy the databases without a current image copy are identified.

In another embodiment of the present invention, a method for automatically creating control cards for restoring a mainframe computing system is provided. A list of databases in a mainframe computing system is received and backup data for each of the databases is received. It is determined what application each of the databases belongs to. Control cards are created for each application for disaster recover and the control cards are read to create job control language statements for disaster recovery.

In yet another embodiment of the present invention, a system for automatically creating control cards for restoring a mainframe computing system. The system comprises: a first receiving component for receiving a list of databases in a mainframe computing system and a second receiving component for receiving backup data for each of the databases. A determining component determines what application each of the databases belongs to. A creating component creates control cards for each application for disaster recovery and a reading component reads the control cards to create job control language statements for disaster recovery.

In another embodiment of the present invention, a system for determining whether databases in a mainframe computing system have updated image copies is provided. The system comprises a first receiving component for receiving a list of all databases in a mainframe computing system and a second receiving component for receiving backup data for each of the databases. A determining component determines from the backup data whether each of the databases has a current image copy. An identifying component identifies the databases without a current image copy.

BRIEF DESCRIPTION OF THE SEVERAL VIEWS OF THE DRAWINGS

The present invention is described in detail below with reference to the attached drawing figures, wherein:

FIG. 5 is a display of an exemplary report of databases and recovery points in a mainframe computing system; and FIG. 6 is a display of exemplary job control language (JCL) and control cards to be used in accordance with an embodiment of the present invention.

DETAILED DESCRIPTION OF THE INVENTION

The present invention provides a system and method for automatically recovering databases in a mainframe computing system. As one of skill in the art will appreciate, the present invention may be embodied, among other things as, a method, a medium, or a computer program product. Accordingly, the present invention may take the form of a hardware embodiment, a software embodiment, or an embodiment combining software and hardware. In a preferred embodiment, the present invention takes the form of a computer program product that includes computer-readable instructions embodied on one or more computer-readable media.

Computer-readable media include both volatile and nonvolatile media, removable and non-removable media, and contemplates media readable by a computer, database, handheld device, etc. Computers are conventional in nature, having several busses coupling memory and storage units to one or more processes and input/output devices. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, data segments, schema, functions, and other data representations. Computer-storage media include, but are not limited to RAM, ROM, EEPROM, flash memory or other memory technology, CD-ROM, digital versatile disks (DVD), holographic media or other optical disk storage, magnetic cassettes, magnetic tape, magnetic-disk storage, and other magnetic-storage devices. These memory components can store data momentarily, temporarily, or permanently on both volatile and nonvolatile memory.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example, but not limitation, communications media include wired media, such as a wired network or direct-wired connection, and wireless media such as acoustic, infrared, radio, microwave, spread-spectrum, and other wireless-media technologies. Combinations of the above are included within the scope of computer-readable media.

Figure 1:
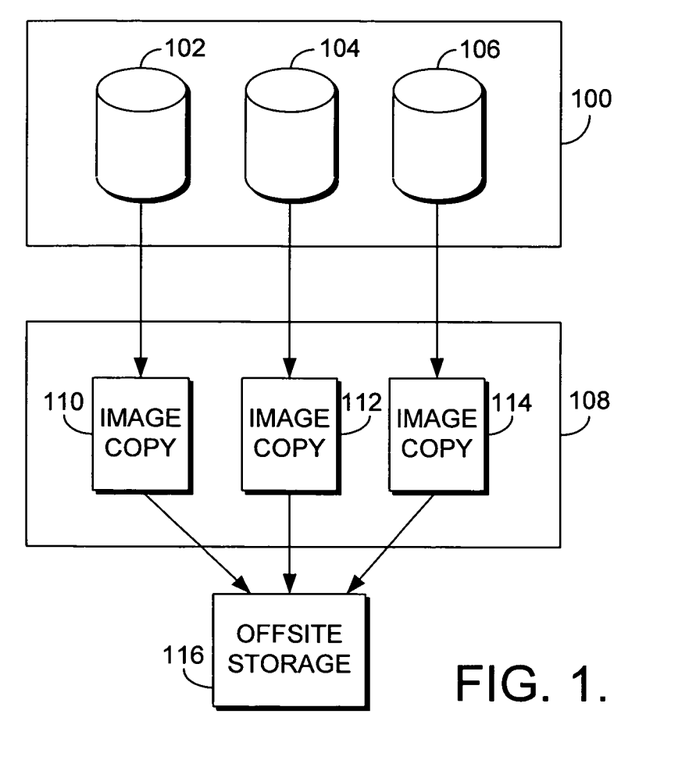
FIG. 1 is a block diagram of an exemplary mainframe computing system and backup recovery system in accordance with an embodiment of the present invention.

FIG. 1 illustrates an exemplary disaster recovery system including a mainframe computing system 100, an image copy database 108, and offsite storage 116. An exemplary mainframe computing system is the Information Management System (IMS) by IBM. An exemplary image copy database is Database Recovery Control (DBRC) in the IMS system which tracks all image copies. Offsite storage is located away from the mainframe system and generally stored on tape. Image copies on disk are copied to tape using ABARS (Automated Backup and Recovery System) by Mainstar. At predefined times, image copies 110, 112, and 114 are made of the databases 102, 104, and 106 of the mainframe computing system 100. In one embodiment, an image copy of each database is made nightly so that the image copy of the database has the most current information. The image copies 110-114 are sent to offsite storage 116 and are accessed for disaster recovery if needed. An image copy is a backup of a database of the mainframe system and/or the backup dataset created.

Figure 2:
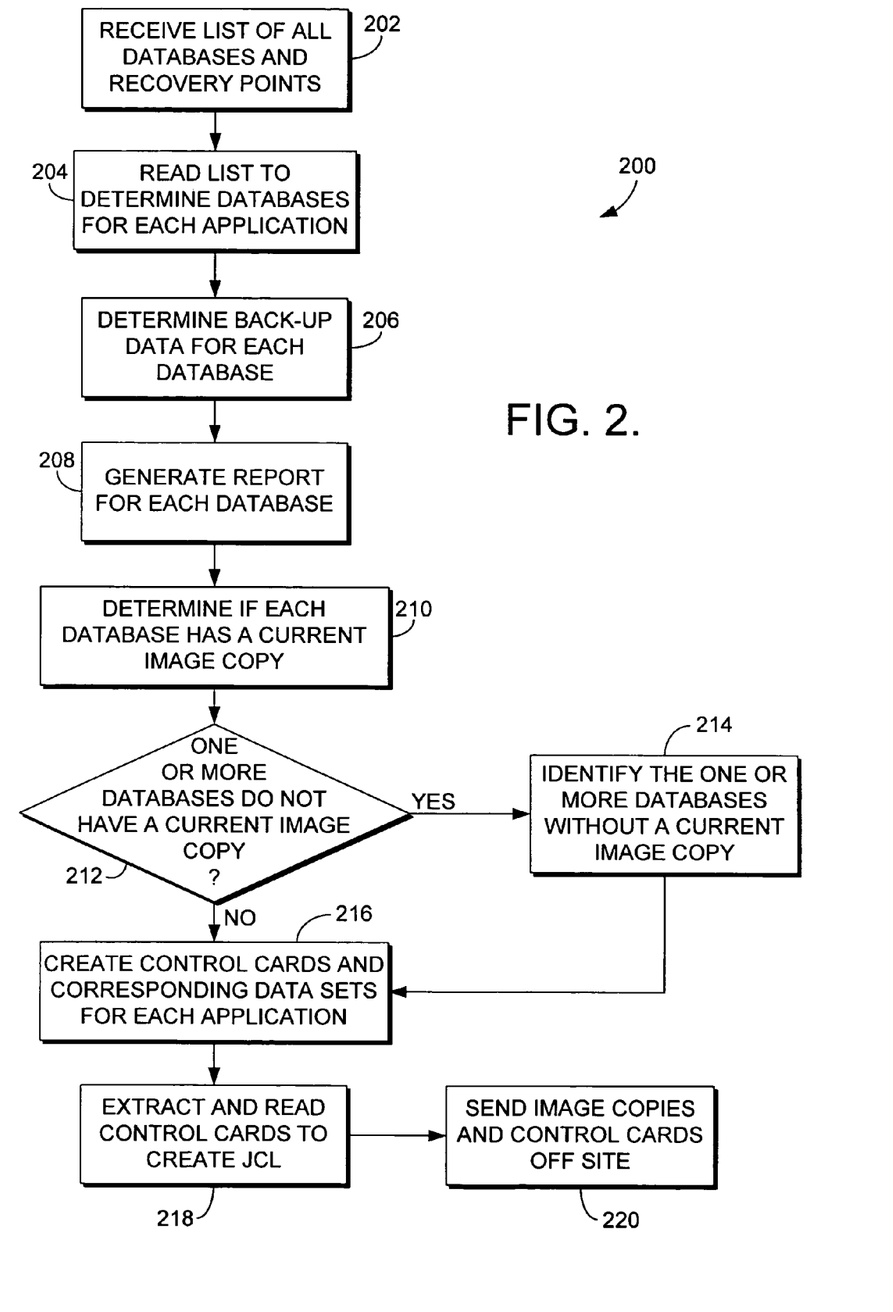
FIG. 2 is a flow diagram describing a method for automatically determining whether each database from the mainframe computing system has a current image copy in accordance with an embodiment of the present invention.

With reference to FIG. 2, a method for determining that image copies have been made of databases in a mainframe computing system is provided. At step 202, the application receives a list of all databases and recovery points in the mainframe computing system. For example, with reference to FIG. 1, databases 102, 104, and 106 would be listed. At step 204, the application reads the list of databases and recovery points and determines the databases for each application. For example, it is determined that all databases with the prefix TAM are for Table Library System while the databases with the prefix TEM are for Telephone Evaluation System as shown in FIG. 5.

Referring again to FIG. 2, at step 206 the backup data for each database is determined. In other words, it is determined when the last image copy for the database was made and whether the image copy is stored on disk or tape. At step 208, the system generates a report of backup data for each database. The reports for each database are included on a larger disaster recovery report that is organized so that the databases for each application are listed together. For example, in FIG. 5 the databases for the SRM, TAR, TAM, TAN, TDM and TEM applications are listed. The databases are grouped by the first three characters of the database name in the disaster recovery report according to the application. For example, the TDM application comprises six databases. Reports for each database are shown in FIG. 5.

Referring to FIG. 2, at step 210 it is determined if each database has an updated image copy. In other words, it is determined whether a current image copy for the database has been made. As stated above, in a preferred embodiment, an image copy is made nightly so that it has the most current information for the database. An image copy may not be current: (1) if the image copy is over seven days old, (2) the database listings indicate that a copy has been made but the image copy is over two days old, (3) the image copy will not work for disaster recovery purposes, (4) no image copy for the database is found, and (5) any variety of other factors indicating that the image copy is not a current copy of the database.

At step 212, it is determined whether one or more of the databases in the mainframe computing system do not have a current image copy. If at step 212 it is determined that one or more databases do not have a current image copy than at step 214 the one or more databases without a current image copy are identified. Databases identified are scheduled to have a new image copy made by a database administrator. With reference to FIG. 5, the databases that do not have a current image copy are identified in the notes section of the report. For example, the TDMHDB database and the TDMEDB database have been scheduled for backup image copies because they do not have current image copies.

Referring again to FIG. 2, at step 216, the control cards and corresponding data sets for each application are created. The control cards are records defining what is to be done in the disaster recovery procedure. Exemplary control cards are shown in FIG. 6. The cards are stored in a file such as DBA.smfid.RECOVCTL as shown in FIG. 6. The control cards include information on the name of the database, accounting center, region, and bank code of the database, the name associated with the image copy prefix and the time the database was imaged. At step 218, the control cards are extracted and read to create a set of job control language (JCL) statements that, when executed, perform a given process such as restoring databases. The JCL statements are stored in a file such as DBA.smfid.RECOVJCL as shown in FIG. 6. The image copies and control cards are sent offsite at step 220. In one embodiment, the image copies are downloaded from disk to tape using ABARS and sent offsite. If a current image copy of one or more databases is not available, the last image copy made of the database is sent offsite until a more current one is made to replace the outdated image copy.

Figure 3:
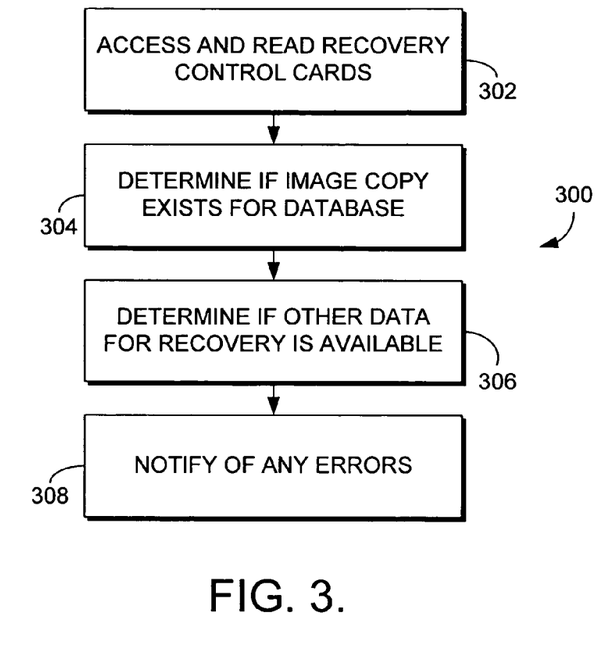
FIG. 3 is a flow diagram describing a method for determining whether any errors exist in the image copies stored for recovery and recovery control cards in accordance with an embodiment of the present invention.

Once the image copies and control cards have been sent offsite for disaster recovery purposes, checks may be run at the disaster recovery site. With reference to FIG. 3, a method for determining whether any errors exist at the disaster recovery site is shown. At step 302, the recovery control cards are accessed and read. At step 304, it is determined whether an appropriate image copy exists for each database in the mainframe computing system. For example, it is determine whether the image copy for each database is the most current image copy that has been made. As discussed above, an image copy may not be current: (1) if the image copy is over seven days old, (2) the database listings indicate that a copy has been made but the image copy is over two days old, (3) the image copy will not work for disaster recovery purposes, (4) no image copy for the database is found, and (5) any variety of other factors indicating that the image copy is not a current copy of the database.

At step 306, it is determined if other assets are needed for recovery is available. Other assets needed for recovery include dynamic allocations, image copy datasets, and delete/defines. At step 308, if the system determines there are any errors, such as databases without current image copies, or whether other assets for recovery are needed, notification of such errors is sent to a database administrator to have necessary image copies made or obtain necessary data for recovery. In one embodiment, a check is run every month at the disaster recovery site to ensure that there are no errors in the disaster recovery process.

Figure 4:
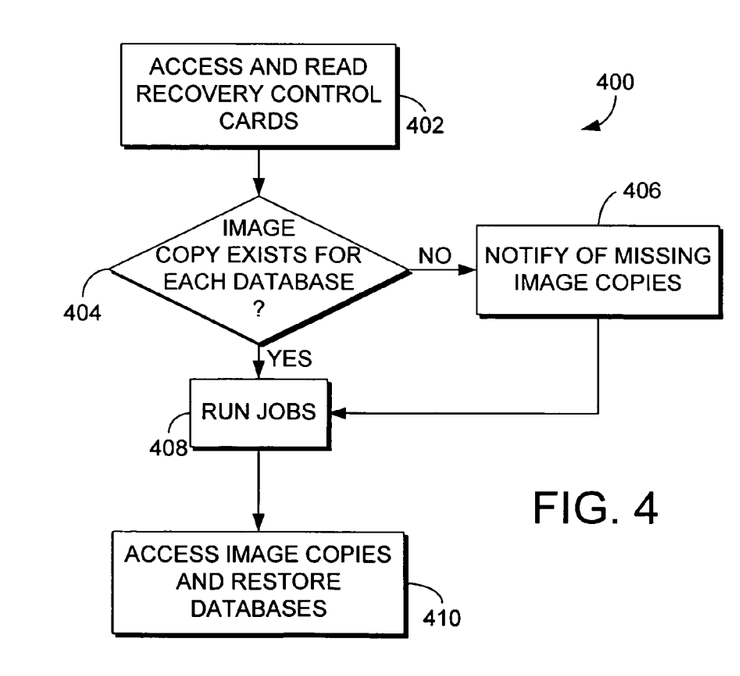
FIG. 4 is a flow diagram describing a method for restoring databases for a mainframe computing system in accordance with an embodiment of the present invention.

With reference to FIG. 4, a method for recovering the mainframe computing system is shown. At step 402, the recovery control cards sent off site are accessed and read. At step 404, it is determined whether an image copy exists for each database. If not, at step 406, a database administrator is notified of missing image copies. The recovery jobs are run at step 408 using the JCL and control cards accessed. At step 410, the image copies are accessed and the databases are restored. In one embodiment, the image copies are transferred from tape to disk using ABARS. Preferably, the method for recovering the mainframe computing system at the disaster recovery site is performed every six months to ensure that the mainframe computing system can be properly restored if needed in an emergency.

Although those skilled in the art will appreciate that the present invention can be embodied in a variety of computer application forms or programming languages, the preferred embodiment of the present invention is written in Statistical Analysis System (SAS). The present invention, however, should not be construed to be limited in any way to SAS applications but rather is merely an embodiment of the present invention. As can be seen, the present invention and its equivalents are well adapted to provide a new and useful method for automatically generating electronic drawings. Many different arrangements of various components depict, as well as components not shown, are possible without departing from the scope of the present invention.

The present invention has been described in relation to particular embodiments which are intended in all respects to be illustrative rather than restrictive. Alternative embodiments will become apparent to those skilled in the art that do not depart from its scope. Many alternative embodiments exist, but are not included because of the nature of this invention. A skilled programmer may develop alternative means for implementing the aforementioned improvements without departing from the scope of the present invention.

It will be understood that certain features and sub-combinations of utility may be employed without reference to features and sub-combinations and are contemplated within the scope of the claims. Not all steps listed in the various figures need to be carried out in the specific order described.

The invention claimed is:

1. A method for determining whether Information Management System (IMS) databases in a mainframe computing system have updated image copies, the method comprising:
    receiving a list of all databases registered with Database Recovery Control (DBRC) software operating in conjunction with IMS in the mainframe computing system;
    receiving backup data from the DBRC for each of the registered databases;
    determining from the backup data whether each of the databases has a current image copy;
    generating reports of the backup data for each of the databases, wherein the reports are included in a disaster recovery report for all of the databases configured to list the databases for each application together;
    identifying the databases without a current image copy;
    automatically creating control cards for use in performing recovery of databases with a current image copy;
    automatically creating JCL statements for use in performing recovery of databases with a current image copy; and
    creating a current image copy of databases identified to be without a current image copy.

2. The method of claim 1, wherein each of the databases does not have the current image copy if the database listings indicate that the database has been updated, but the image copy has not been made.

3. The method of claim 1, wherein each of the databases does not have the current image copy if the image copy is over seven days old.

4. The method of claim 1, wherein each of the databases does not have the current image copy if the database listings indicate that the copy has been made but the image copy is over two days old.

5. The method of claim 1, wherein each of the databases does not have the current image copy if no image copy for the database is found.

6. The method of claim 1, wherein each of the databases does not have the current image copy if the current image copy of the database is not a copy made during the most recent nightly backup.

7. The method of claim 1, wherein creating a current image copy further comprises:
    determining what application each of the databases belongs to.

8. The method of claim 7, wherein the application each of the databases belongs to is determined by the first three characters of the database name.

9. The method of claim 8, wherein each of the applications is for an accounting center in the mainframe computing system.

10. The method of claim 9, wherein the control cards are records defining what is to be done in a disaster recovery program and include information on a name of the database, an accounting center, a region, a bank code of the database, a name associated with an image copy prefix, and a time the database was imaged.

11. The method of claim 10, wherein the job control language statements, when executed, perform a process of restoring the databases, and wherein a disaster recovery test is performed periodically to ensure that the mainframe computing system is restorable in an emergency situation.

12. The method of claim 11, further comprising:
downloading the image copies from disk to tape using automatic backup archive and recovery software (ABARS);
transferring the database image copies, the control cards and the job control language statements to offsite storage to be used for disaster recovery; and
determining if any errors exist at a disaster recovery site comprising:
accessing and reading the control cards;
determining from the mainframe computing system if each of the databases has a current image copy;
determining if other assets are needed for recovery including dynamic allocations,
image copy datasets, and delete or defines;
determining whether there are errors including a lack of current images or the other assets; and
sending a notification to a database administrator to correct the errors.

13. The method of claim 1, further comprising:
scheduling an image copy to be made by a database administrator for each of the databases without current image copies, wherein a notes section of the disaster recovery report indicates the databases without current image copies.

14. A non-transitory computer-readable storage medium having computer readable instructions stored thereon for execution by a processor that, when executed by the processor, causes the processor to:
determine whether Information Management System (IMS) databases in a mainframe computing system have updated image copies;
receive a list of all databases registered with Database Recovery Control (DBRC) software operating in conjunction with IMS in the mainframe computing system;
receive backup data from the DBRC for each of the registered databases;
determine from the backup data whether each of the databases has a current image copy;
generating reports of the backup data for each of the databases, wherein the reports are included in a disaster recovery report for all of the databases configured to list the databases for each application together;
identify the databases without a current image copy;
automatically create control cards for use in performing recovery of databases with a current image copy;
automatically create JCL statements for use in performing recovery of databases with a current image copy; and
create a current image copy of databases identified to be without a current image copy.

15. A method for automatically creating control cards for restoring a mainframe computing system, the method comprising:
receiving a list of Information Management System (IMS) databases registered with Database Recovery Control (DBRC) software operating in conjunction with Information Management System (IMS) in the mainframe computing system;
receiving backup data from the DBRC for each of the databases;
determining whether each of the databases has a current image copy;
generating reports of the backup data for each of the databases, wherein the reports are included in a disaster recovery report for all of the databases configured to list the databases for each application together;
identifying each of the databases without a current image copy;
creating a current image copy of databases identified to be without a current image copy; and
determining if any errors exist at a disaster recovery site comprising:
accessing and reading the control cards;
determining from the mainframe computing system if each of the databases has a current image copy;
determining if other assets are needed for recovery including dynamic allocations, image copy datasets, and delete or defines;
determining whether there are errors including a lack of current images or the other assets; and
sending a notification to a database administrator to correct the errors;
determining what application each of the databases belongs to;
automatically creating control cards for each application for disaster recovery; and
reading the control cards to create job control language statements for disaster recovery, wherein the control cards include information including a name of the database, an accounting center, a region, a bank code of the database, a name associated with an image copy prefix, and a time the database was imaged.

16. The method of claim 15, wherein the control cards are records defining what is to be done in a disaster recovery program, and wherein the job control language statements, when executed, perform a process of restoring each of the databases.

17. The method of claim 15, further comprising:
performing a disaster recovery check periodically by accessing the control cards and executing the job control language statement to ensure that the mainframe computing system and the corresponding databases are restorable in an emergency situation.

18. The method of claim 15, further comprising:
converting the image copies to a backup format using automatic backup archive and recover software; and
transferring the database image copies, the control cards and the job control language statements to offsite storage to be used for disaster recovery.

19. A system for determining whether Information Management System (IMS) databases in a mainframe computing system have updated image copies, the system comprising:
a processor for executing a set of instruction;
a memory configured to store the set of instructions, wherein the set of instructions include:
a first receiving component configured to receive a list of databases registered with Database Recovery Control (DBRC) software operating in conjunction with IMS in the mainframe computing system;
a second receiving component configured to receive backup data from the DBRC for each of the registered databases;
a determining component configured to determine from the backup data whether each of the databases has a current image copy;
a report component configured to generate reports of the backup data for each of the databases, wherein the reports are included in a disaster recovery report for all of the databases configured to list the databases for each application together;

an identifying component configured to identify the databases without a current image copy;

a first creating component for automatically creating control cards for use in performing recovery of databases with a current image copy;

a second creating component for automatically creating JCL statements for use in performing recovery of databases with a current image copy; and a third creating component for creating a current image copy of databases identified to be without a current image copy; and an error checking component configured to determine if any errors exist at a disaster recovery site, the error checking component configured to access and read the control cards, determine from the mainframe computing system if each of the databases has a current image copy, determine if other assets are needed for recovery including dynamic allocations, image copy datasets, and delete or defines, determine if there are errors including a lack of current images or the other assets, and send a notification to a database administrator to correct the errors.

20. The system of claim 19, wherein each of the databases does not have the current image copy if the database listings indicate that the database has been updated, but the image copy has not been made.

21. The system of claim 19, wherein each of the databases does not have the current image copy if the image copy is over seven days old.

22. The system of claim 19, wherein each of the databases does not have the current image copy if the database listings indicate that the copy has been made but the image copy is over two days old.

23. The system of claim 19, wherein each of the databases does not have the current image copy if no image copy for the database is found.

24. The system of claim 19, wherein each of the databases does not have the current image copy if the image copy of the database is not a copy made during the most recent nightly backup.

25. The system of claim 19, wherein the set of instructions further comprise:

a second determining component configured to determine what application each of the databases belongs to.

26. The system of claim 25, wherein the set of instructions are written in statistical analysis system, and wherein the application each of the databases belongs to is determined by the first three characters of the database name.

27. The system of claim 26, wherein each of the applications is associated with an accounting center in the mainframe computing system.

28. The system of claim 27, wherein the control cards are records defining what is to be done in a disaster recovery program.

29. The system of claim 28, wherein the job control language statements, when executed, perform a process of restoring the databases.

30. The system of claim 29, further comprising:

transferring component configured to transfer the database image copies, the control cards and the job control language statements to offsite storage to be used for disaster recovery.

31. A system for automatically creating control cards for restoring a mainframe computing system, the system comprising:

a processor for executing a set of instruction;

a memory configured to store the set of instructions, wherein the set of instructions include:

a first receiving component configured to receive a list of Information Management System (IMS) databases registered with Database Recovery Control (DBRC) software operating in conjunction with IMS in the mainframe computing system;

a second receiving component configured to receive backup data from the DBRC for each of the registered databases;

a determining component configured to determine what application each of the databases belongs to based on a prefix;

a creating component configured to automatically create control cards for each application for disaster recovery;

a reading component configured to read the control cards to create job control language statements for disaster recovery;

a second creating component configured to create a current image copy of databases identified to be without a current image copy and convert the image copy for storage in the appropriate format;

an error checking component configured to determine if any errors exist at a disaster recovery site, the error checking component configured to access and read the control cards, determine from the mainframe computing system if each of the databases has a current image copy, determine if other assets are needed for recovery including dynamic allocations, image copy datasets, and delete or defines, determine if there are errors including a lack of current images or the other assets, and send a notification to a database administrator to correct the errors; and a verification component configured to determine if the job control language and control cards function properly to recover the backup data from the disaster recover site.

32. The system of claim 31, wherein the job control language statements, when executed, perform a process of restoring each of the databases.

33. The system of claim 31, wherein the control cards are records defining what is to be done in a disaster recovery program and include information on a name of the database, an accounting center, a region, a bank code of the database, a name associated with an image copy prefix, and a time the database was imaged.

34. The system of claim 31, wherein the set of instructions further comprise:

a second determining component configured to determine whether each of the databases has a current image copy; and an identifying component configured to identify the databases without a current image copy.

35. The system of claim 34 wherein the set of instructions further comprise:

a scheduling component configured to schedule a database administrator to make the current image copy;

a transferring component configured to transfer the database image copies, the control cards and the job control language statements to offsite storage to be used for disaster recovery.

* * * * *